United States Patent [19]

Salem et al.

[11] 4,385,323

[45] May 24, 1983

[54] CAMERA PICKUP TUBE CIRCUIT FOR AUTOMATICALLY SUPPRESSING EXCESSIVE HIGHLIGHTS IN RESPONSE TO THEIR OCCURRENCE

[75] Inventors: Raoul B. Salem, Redwood City; Vinson R. Perry, San Carlos, both of Calif.

[73] Assignee: Ampex Corporation, Redwood City, Calif.

[21] Appl. No.: 802,839

[22] Filed: Jun. 2, 1977

[51] Int. Cl.³ .............................................. H04N 5/30
[52] U.S. Cl. ................................................... 358/223
[58] Field of Search ............... 358/209, 217, 219, 223, 358/905

[56] References Cited

U.S. PATENT DOCUMENTS 3,764,738 10/1973 Zettl et al. ........................... 358/223
3,955,116 5/1976 van den Berg ..................... 358/223

*Primary Examiner*—Aristotelis M. Psitos
*Attorney, Agent, or Firm*—Joel D. Talcott; John Flannery; George B. Almeida

[57] ABSTRACT

A circuit for suppressing the effects of excessive highlights is automatically enabled in response to highlights in the viewed scene which exceed a given threshold. The circuit is used in combination with a special pickup tube or tubes which include excessive highlight protection elements and a corresponding mode of operation. The circuit allows the continuous operation of the pickup tubes with improved resolution at a heretofore prohibitive, but preferred, high voltage level (e.g., 950 volts), rather than the generally accepted and recommended operating level (e.g., 750 volts) therefor, while prolonging the lifetime of such tubes. Detector means generates the circuit enable signal in response to the presence of highlights in excess of the given threshold. Control circuit means are conditioned thereby to drive the tube into the corresponding mode of operation during the line flyback period corresponding to the horizontal blanking interval.

11 Claims, 18 Drawing Figures

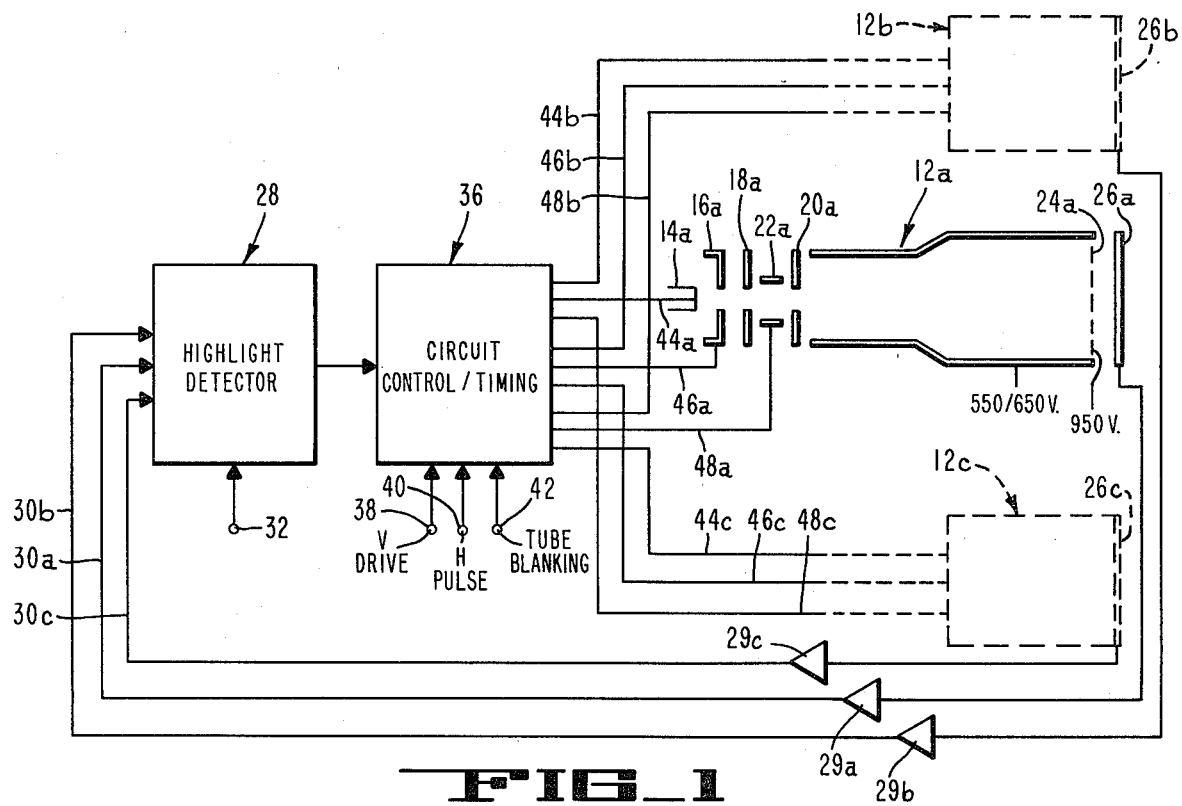
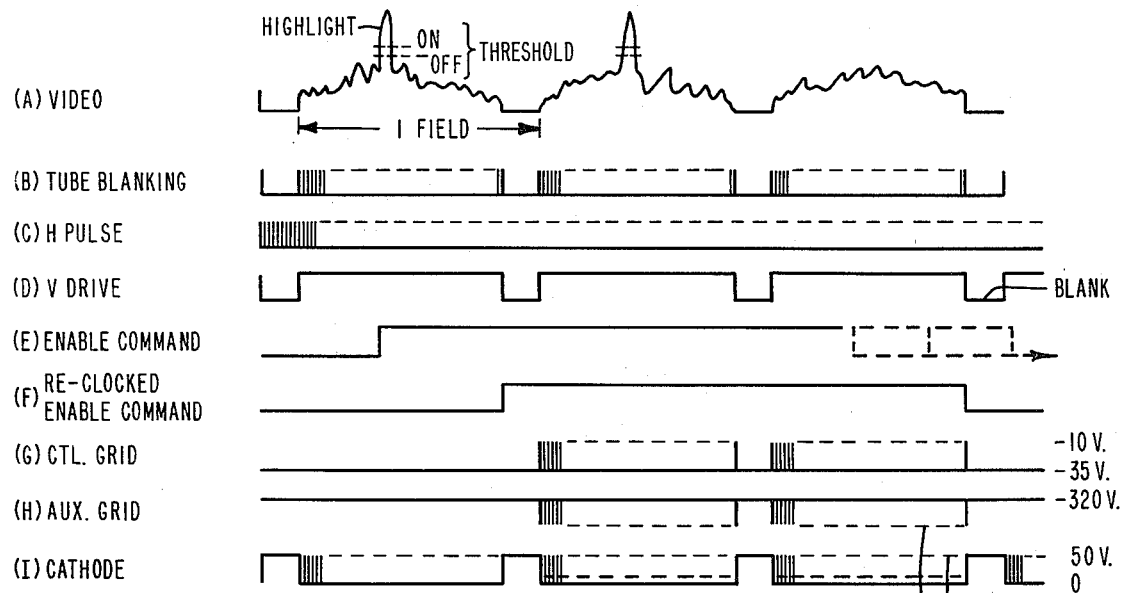
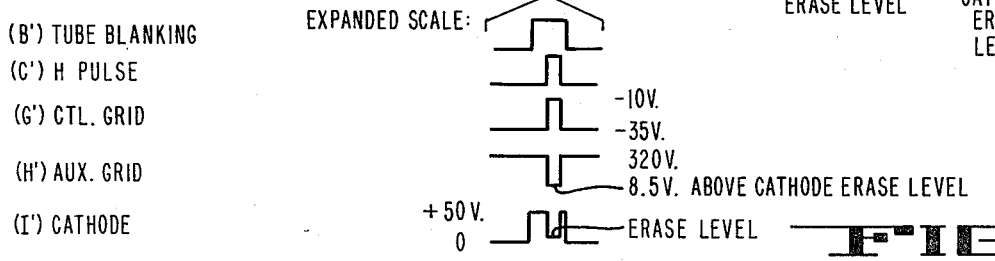

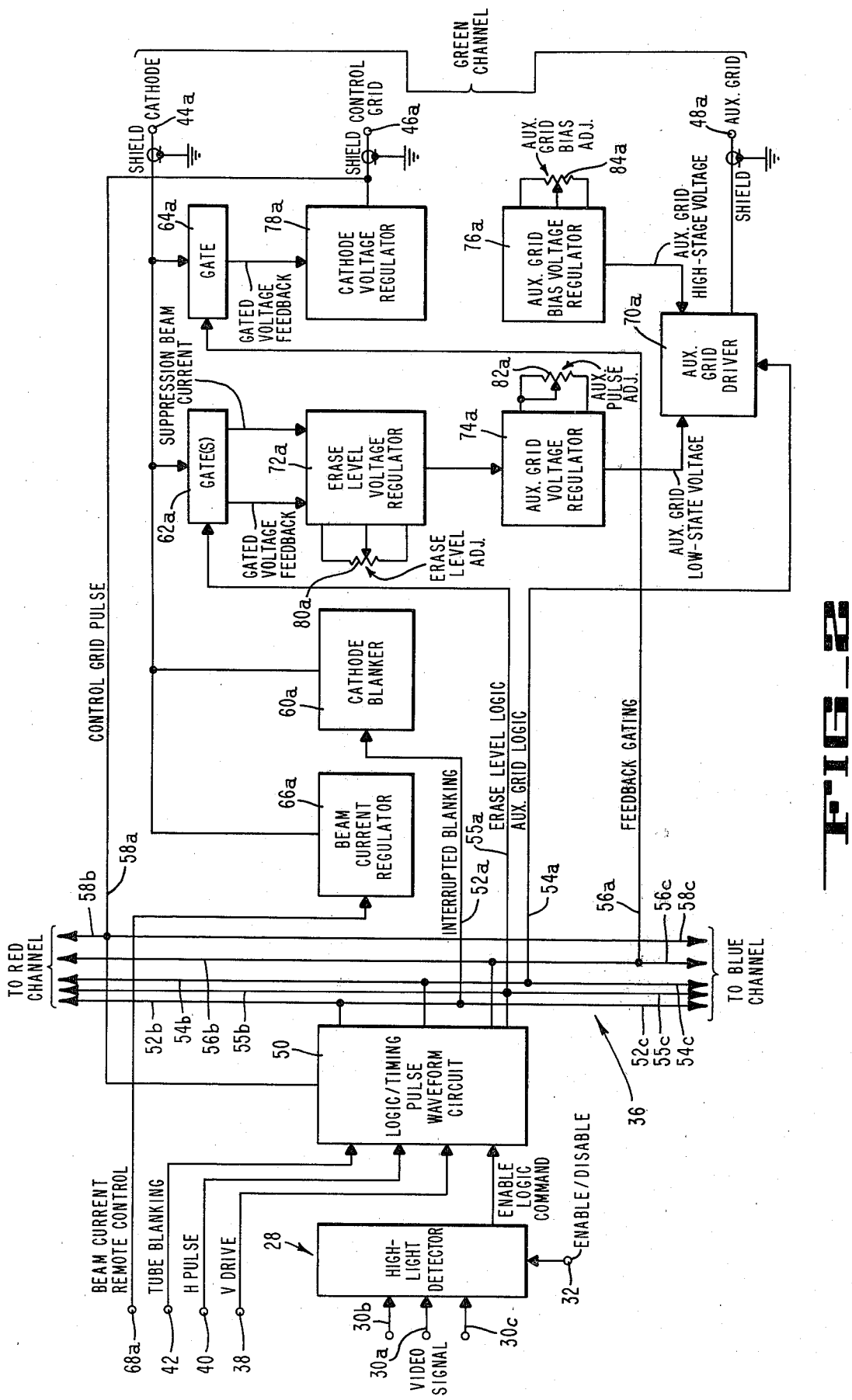
FIG_2

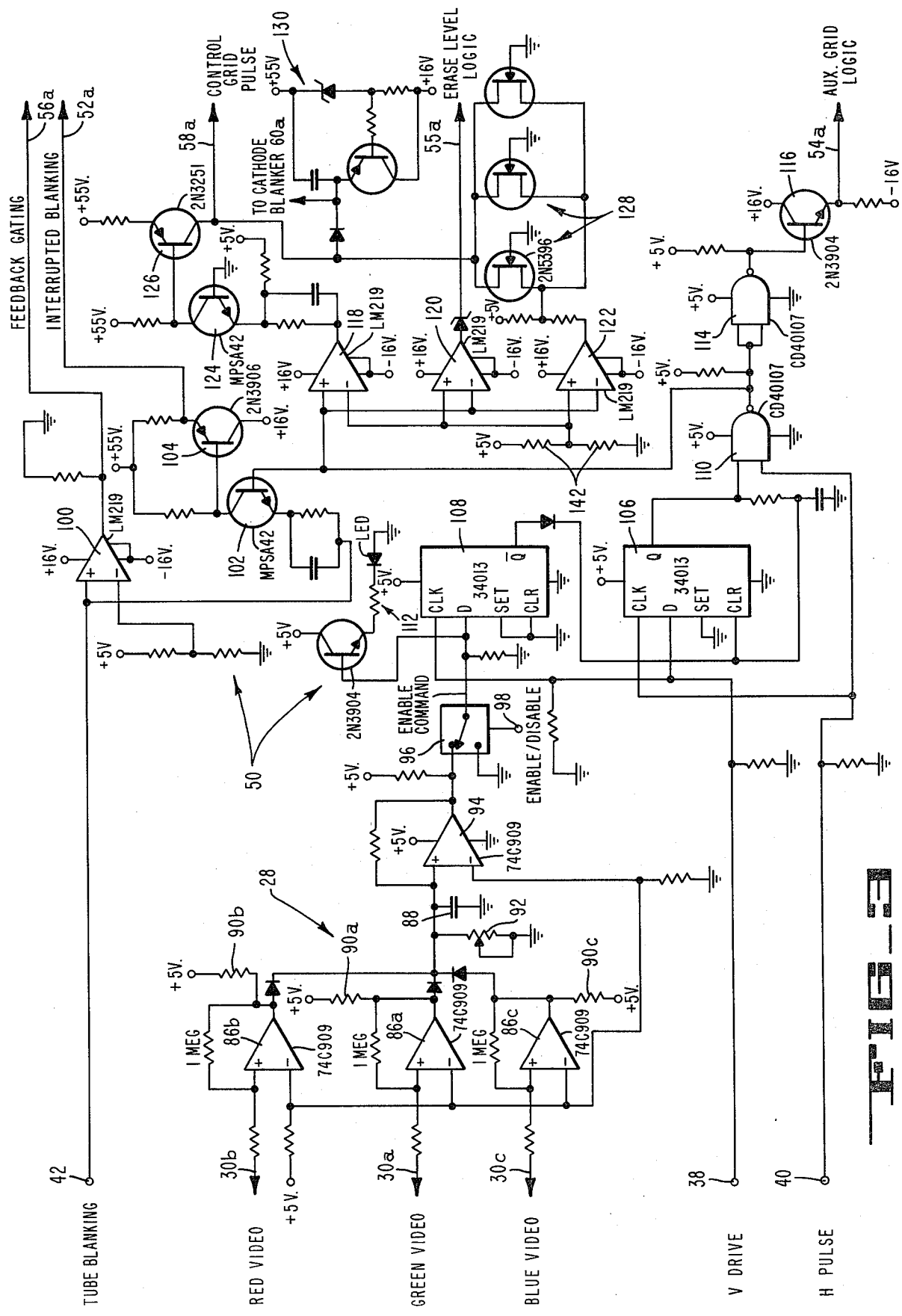

CAMERA PICKUP TUBE CIRCUIT FOR AUTOMATICALLY SUPPRESSING EXCESSIVE HIGHLIGHTS IN RESPONSE TO THEIR OCCURRENCE

BACKGROUND OF THE INVENTION

1. Field

The invention relates to a video camera pickup tube circuit which automatically selects the mode of operation of the tube in response to the presence or absence of excessive highlights in the viewed scene.

2. Prior Art

The level of limitation of the dynamic range of a Plumbicon pickup tube is determined by the maximum beam current that can be applied without causing unacceptable discharge lag, loss of resolution, or loss of registration. Highlights in excess of the beam current setting cause local unstabilization of the Plumbicon target. Intensely illuminated target elements lose more charge between successive scans than the limited beam can replenish and therefore their potential rises towards that of the signal plate. As the scanning beam approaches or leaves the resulting high potential highlight area it is attracted or retarded respectively by the greater potential. Thus, the beam is pulled ahead of or behind its normal time-position track.

When a highlight is fixed in position with relation to the camera, particularly when viewing intense highlights, the corresponding target elements and also the adjacent elements become almost fully discharged. With the added possibility of optical dispersion within the layer itself, the cumulative effect is to enlarge the unstabilized target area around the highlight, thus causing the associated picture area to appear vacant or washed-out.

A moving highlight, caused by movement in the scene or by panning the camera, requires many scans before the successively discharged elements are stabilized. Each scan produces a highlight diffusion in a fractionally different position thus causing a blur in the picture known as a comet-tail. The length, and intensity, of the comet-tail depends on factors such as highlight intensity and velocity, target storage capacitance and voltage, and beam current.

Recently it has been found that the disadvantages of excessive highlights may be allayed by the introduction of a high intensity beam during the line flyback period of the pickup tube. The intensity of this beam is increased to allow it to replenish the majority of discharges caused by highlights to effectively limit the potential excursions of associated target picture elements to an acceptable peak signal level. These are then stabilized by the subsequent normal read-out scanning beam. However, the use of the high intensity beam to replenish the discharges is disadvantageous in that it also generates an excess of soft X-rays which bombard the target, thereby significantly reducing the lifetime of the pickup tube. To prolong its lifetime, the tube thus must operate with its target at a decreased potential of the order of 750 volts. This compromise in turn causes an undesirable decrease in resolution and increased sensitivity of the scan beam to deflection by the earth's magnetic field, while still causing a reduction in the lifetime of the tube due to the soft X-rays generated by its generally continuous operation.

A tube employing the high intensity beam is controlled by a circuit which provides suitably-timed pulses to the various electrodes of the tube to generate the high intensity beam during the line flyback period. However, the high intensity beam is generated during every line flyback period of every field even in the absence of excessive highlights. This continuous operation causes the aforementioned significant reduction in the tube lifetime since soft X-rays are generated during every flyback period, even though the tube mesh is operated at the (less desirable) reduced potential.

SUMMARY OF THE INVENTION

The invention overcomes the above-mentioned modified shortcomings of the prior art in that it enables operation of a modified camera pickup tube at a voltage higher than the recommended and acceptable operating voltage therefor, with negligible deterioration in the life of the tube, while maintaining picture resolution. To this end, the tube, which is adapted to generate the high intensity beam during the line flyback period, is selectively and automatically driven in a highlight suppression mode of operation only in response to the selected threshold, and during the line flyback period corresponding to horizontal blanking.

A highlight detection circuit integral with the video processor circuit in the camera system detects the existence of highlights in the viewed scene in excess of the selected threshold, and generates in response thereto a highlight suppression enable command. A control circuit coupled to the detection circuit drives the pickup tube in a normal mode in the absence of the enable command. However, in the presence of the enable command, the control circuit drives the tube into the highlight suppression mode to replenish the discharges in the target caused by highlights in the viewed scene.

The enable command is not executed until the vertical blanking period begins, so that there is no entry into, or exit from, the highlight suppression mode of operation except during the vertical blanking period, thereby not causing any undesired disturbance of the video picture. As a result of operating in the highlight suppression mode only upon command, the tube target may be maintained at a higher operating voltage of, for example, 950 volts, thereby maintaining tube resolution without foreshortening the lifetime.

BRIEF DESCRIPTION OF THE DRAWINGS

FIG. 1 is a simplified block diagram of the invention tube circuit in combination with a special Plumbicon pickup tube which includes an excessive highlight suppression electrode configuration.

FIG. 2 is a more detailed block diagram of the tube circuit of FIG. 1.

FIGS. 3 and 4 are schematic diagrams exemplifying, by way of example only, one implementation of the block diagram of FIGS. 1 and 2.

FIGS. 5A-I, B', C', G', H', I', are waveforms generated at various points along the circuitry of the FIGS. 1-4.

DESCRIPTION OF THE PREFERRED EMBODIMENTS

Figure 4:
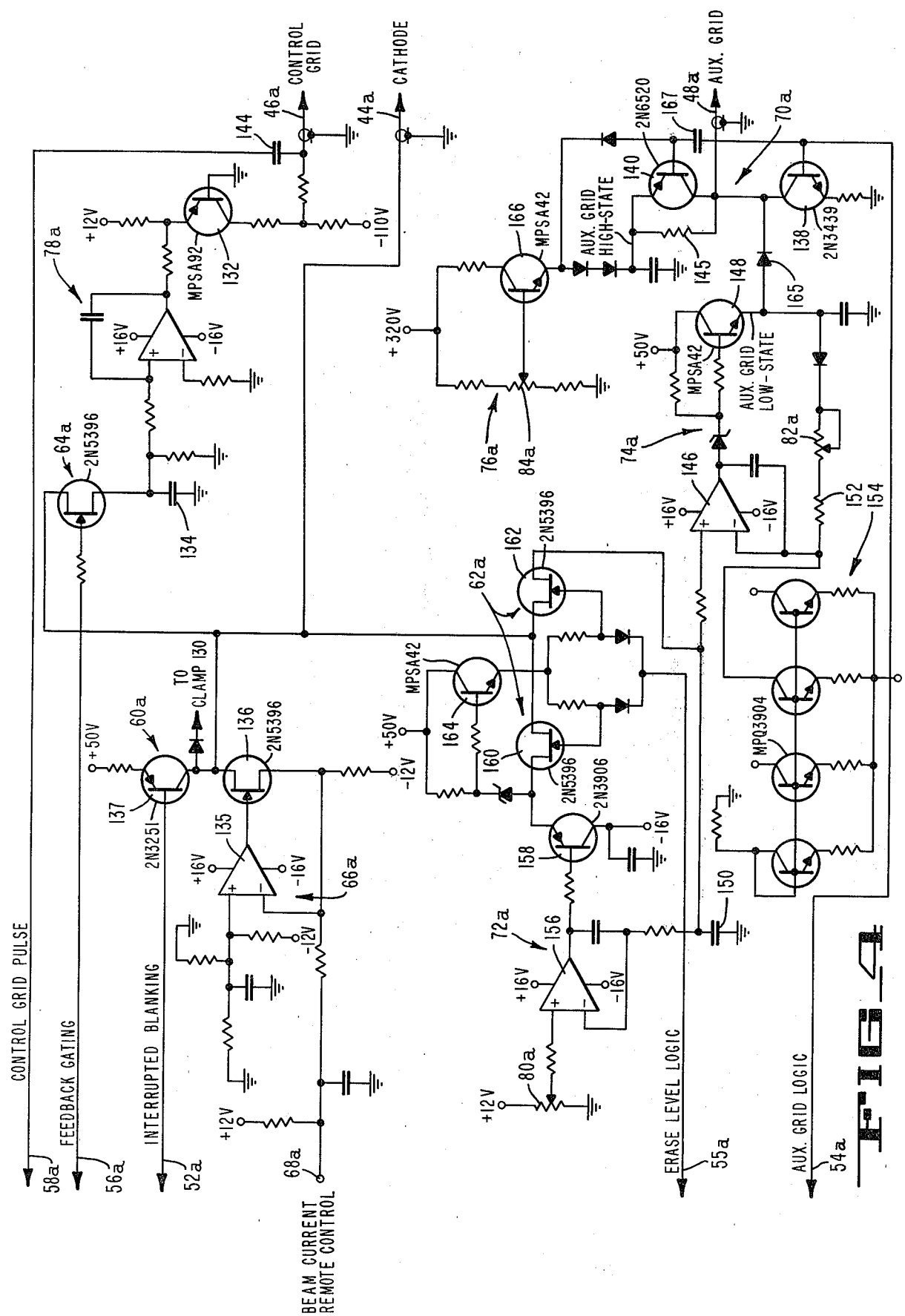

FIG. 1 depicts the basic excessive highlight suppression circuit in combination with video camera pickup tubes, which herein comprises a modification of the Plumbicon tube, i.e., a pickup tube employing a configuration for generating a high intensity beam during the line flyback period, and hereinafter termed excessive highlight suppression pickup tubes 12a, b, c. Tube 12a includes a cathode 14a, a control grid 16a, a first anode 18a which is electrically interconnected to a limiter element 20a, an auxiliary grid 22a disposed between the anode 18a/limiter 20a, a field mesh 24a, and a target 26a. Typical of such pickup tubes are those known in the art under the designation of "anti-comet-tail" Plumbicons, and "highlight overload protection" Leddicons, etc. For simplicity, only the green color channel tube 12a configuration is depicted in FIG. 1, with the corresponding red and blue tubes 12b and 12c, and associated red and blue color channels, respectively, depicted in phantom line.

The highlight suppression circuit includes a highlight detector means 28 disposed to receive the RGB video signals initiated by the targets 26a, 26b and 26c via respective preamplifiers 29a, 29b, 29c and the conventional video processor in the camera head (not shown) along input lines 30a, b, c. The highlight detector means 28 further receives an enable/disable signal via an input 32. The preamplifiers are high-dynamic-range devices capable of handling the highlight discharging signals. The highlight detector means 28 introduces an excessive highlight suppression enable command to a circuit control/timing means 36, which also receives vertical (V) drive, a form of (H) drive and blanking signals via terminals 38, 40 and 42 respectively, also generated within the camera head circuitry. The control/timing means 36 in turn generates outputs which are supplied to the cathodes 14a, b, c, the control grids 16a, b, c, and to the auxiliary grids 22a, b, c, of the pickup tubes 12a, b, c, via lines 44a, b, c, 46a, b, c, and 48a, b, c, respectively. These outputs selectively drive the tubes in the excessive highlight suppression mode of operation, as described hereinafter.

FIG. 2 shows a more detailed block diagram of the highlight suppression circuit including the highlight detector means 28 and the control/timing means 36. Like components in the figures employ similar numerals. The highlight detector means 28 is coupled to a logic/timing pulse waveform circuit 50 of the control/timing means 36. Waveform circuit 50 receives the tube blanking signal on input 42, the H pulse signal on input 40 and the V drive signal on input 38, as well as the enable command from the highlight detector means 28. Circuit 50 generates an interrupted blanking signal on line 52a, an auxiliary grid pulse timing signal on line 54a, a regulator feedback gating signal on line 56a and a control grid pulse on line 58a, an erase level logic signal on line 55a, wherein the subscript "a" indicates the green color channel components. The interrupted blanking signal on line 52a is introduced to a cathode blanker 60a and thence to the cathode of the pickup tube 12a via the line 44a. The auxiliary grid logic signal on line 54a is introduced to an auxiliary grid driver means 70a. The regulator feedback gating signal on line 56a is introduced to gate means 64a. The erase level logic signal on line 55a is introduced to gate means 62a. The cathode is thus connected to an erasure voltage by said gate means 62a. A beam current regulator 66a is coupled at its input to a beam current remote control signal via an input 68a, and at its output to the cathode. The remote control signal on input 68a is a DC voltage level generated by a potentiometer (not shown) at a remote camera control unit at the command of the operator.

The gate means 62a is coupled to an erase level voltage regulator 72a which in turn is coupled to an auxiliary grid voltage regulator 74a. Regulator 74a is coupled to the auxiliary grid driver 70a which also receives a high-state voltage input from an auxiliary grid bias voltage regulator 76a. The auxiliary grid driver 70a provides the output signal to the tube auxiliary grid 22a of the pickup tube 12a via the line 48a.

The gate means 64a is coupled to a cathode voltage regulator 78a whose output is coupled to the control grid pulse on line 58a and thence to the control grid 16a of the tube 12a via the line 46a.

The output of the erase level voltage regulator 72a is variable, for example, from 0 to 15 volts via an erase level adjust potentiometer 80a. The auxiliary grid voltage regulator 74a is adjustable by means of an auxiliary pulse adjust potentiometer 82a, and the auxiliary grid bias voltage regulator 76a is adjusted via an auxiliary grid bias adjust potentiometer 84a.

The components 52a-84a shown in FIG. 2 define the green color channel circuitry which is coupled to the green pickup tube 12a of FIG. 1. It is to be understood that the output signals from the logic/timing pulse waveform circuit 50 inter alia are also coupled to the red and blue color channels as depicted in FIGS. 1 and 2, which channels contain electronic circuitry similar to that shown here in the green color channel and which include the red and blue pickup tubes 12b, 12c.

FIGS. 3 and 4 illustrate in schematic one implementation of the excessive highlight suppression circuit, wherein like components in the FIGS. 2-4 are similarly numbered. Referring to FIGS. 1-4, in operation, the green, red and blue video color signals from the targets 26a, b, c via the preamplifiers 29a, b, c and lines 30a, b, c, are DC restored and blanked within the video processor (not shown) so as to provide the true active video signals. The signals are supplied to respective comparators 86a, b, c, whose negative inputs are coupled to a threshold voltage level of, for example, 5 volts indicative of the highlight threshold over which the video level is objectionable, i.e., is an excessive highlight. For example, the 5 volts on the individual comparators may correspond to 150% of the normal video peak white level. The three (RGB) video signals are individually compared therein to the selected threshold level and if any one, two or all of the red, green or blue video signals exceed the threshold, the respective comparator(s) 86 generate a high state. The outputs of the comparators 86a, b, c, are summed into a common storage capacitor 88, whose charge is determined by resistors 90a, b, c, and whose discharge time is determined by resistor 92. By way of example, the capacitor 88 charge and discharge times are 30 microseconds, and zero to three-tenths of a second, respectively. Thus the excessive highlight suppression circuit is enabled in response to the amplitude and the duration of a detected excessive highlight either on a line or a field basis. If a highlight is sufficiently intense for one microsecond for 30 lines, or 30 microseconds for one line, it activates the highlight detector 28. Respective resistors 98a, b, c provide positive feedback and a selected amount of hysteresis to provide stabilization of the comparators.

The output of the comparators 86a, b, c is detected via detector 94 which in turn provides the actual enable command, which is then introduced to the circuit control/timing means 36 (FIG. 4). An electronic switch 96 may be coupled to the detector 94 and is controlled by an enable/disable DC input (line 98) which is multiplexed up the camera cable (not shown) whereby the operator may completely disable or enable the excessive highlight suppression circuit.

The detection scheme herein implemented to detect excessive highlights may utilize other detecting techniques. For example, an amplifier or clipper circuit may be biased to some selected level, wherein a video signal beyond the level would generate a suppression circuit enable signal. Thus the highlight detector means 28 may be said to define in essence a peak detector with controlled charge and discharge times.

In "normal" operation, i.e., when viewing a scene which has no excessive highlights, the pickup tubes 12a, b, c are operated in conventional mode without need for the generation of the high intensity beam during the line flyback period since there is no unusually heavy discharge of the target elements which need replenishing. During this time, the highlight detector output, i.e., the enable command, is in a low state (zero volts) and does not influence the subsequent control/timing means 36, or the pickup tubes 12a, b, c operation. Accordingly, the control/timing means 36 provides the generally conventional tube drive signals, both during the active scan and the horizontal and vertical blanking intervals.

To this end, the tube blanking signal on input 42 (FIG. 3) is supplied to a comparator 100, and to transistors 102, 104. The V Drive signal on line 38 is supplied to the clock and "D" inputs of the D-type flip-flops 108, 106 respectively. The H pulse signal on line 40 is fed to the clock input of the flip-flop 106 and to a NAND gate 110. It should be noted that H pulse corresponds to the actual H beam deflection signal, wherein however, since the scan apparatus is slower than the suppressor circuit, H drive to the scan apparatus is modified to occur slightly before H pulse of input 40 (FIGS. 5B', C'), to synchronize the events triggered by the two signals. The enable command signal from the detector 94 is coupled to the "D" input of flip-flop 108, and to an indicator circuit 112 formed of a transistor and an LED device which provide a visual indication when the enable command is generated. The $\bar{Q}$ output of flip-flop 108 is coupled to the clear input of flip-flop 106, and along with the Q output of flip-flop 106 is coupled to the clear input of flip-flop 106. Flip-flop 108 provides means for vertically re-clocking the enable command from the highlight detector means 28, while flip-flop 106 provides a means of inhibiting during vertical blanking of the pulses required for highlight suppression. The NAND gate 110 is coupled to the base of transistor 102, which causes interruption of the cathode blanking during a selected portion of the horizontal blanking interval, and to an inverting stage 114, the latter being coupled to a transistor 116 which generates the auxiliary grid logic signal on line 54a.

The output of NAND gate 110 is further fed to the positive input of a comparator 118 and to the negative inputs of comparators 120 and 122, the other inputs of which are coupled to a given voltage trigger level, wherein the comparators are used principally as drivers. Comparator 118 is coupled to a pair of transistors 124, 126, where the latter is a pull-up transistor whose collector provides the positive-going transition of the control grid pulse on line 58a. Comparator 120 provides the erase level logic signal on line 55a, which is time-coincident with the auxiliary grid logic signal on line 54a but with different pulse voltage levels. Comparator 122 is coupled to a pull-down FET stage 128, which is thence coupled to the collector output of the transistor 126 thus providing the negative-going transition of the control grid pulse on line 58a. A clamp circuit 130 is also connected to the collector and provides a clamp voltage for the control grid signal, which limits the amplitude of the pulse to the recommended level and prevents saturation of transistor 126.

As previously mentioned, in the absence of excessive highlights the circuit hereof also provides the generally conventional tube drive signals both during the active scan and the horizontal and vertical blanking intervals. To clarify the operation of the excessive highlight suppression mode of operation and associated circuitry, it is thus desirable to briefly describe the operation of the circuit when not in the excessive highlight suppression mode.

To this end, referring to FIGS. 3 and 4, during the active scan period when the tube is scanning forward with no blanking, the tube blanking signal is high (5 volts) whereby the blanking signal from the comparator is also high on line 56a which turns on the FET of voltage regulator feedback gate 64a, which in turn allows the feedback to be fed to the cathode voltage regulator 78a. The output of the cathode voltage regulator is fed via a drive transistor 132 to the control grid 16a via the line 46a. Thus the cathode voltage regulator 78a provides means for maintaining the operating voltage of the cathode at zero volts by regulating the DC voltage to the control grid. The cathode feedback path includes the voltage regulator feedback gate 64a and a hold capacitor 134, whereby the voltage regulator 78a determines whether the cathode voltage is too high or too low during normal readout and restores it to zero volts by varying the voltage to the control grid.

The beam current regulator 66a is a constant current source and contains an operational amplifier 135 and a FET 136, and is controlled by a remote control signal via input 68a which adjusts the beam current, for example, from zero to one millampere as regulated by a potentiometer (not shown) under control of the operator.

During the conventional horizontal line flyback period, the pickup tube must be blanked to not interfere with the picture and accordingly, the tube blanking signal on input 42 goes low (zero volts). The blanking signal from comparator 100 goes low, which turns off the feedback gate 64a thereby interrupting the cathode voltage regulator feedback path. The cathode blanker 60a, including a pull-up transistor 137, is normally off during the active scan. During blanking, however, the transistors 102, 104 of FIG. 3 are turned on by the tube blanking signal, which in turn switches on the cathode blanker transistor 137. The latter raises the cathode potential to a level determined by the clamp 130 of FIG. 3 (+50 volts) thereby raising the cathode potential positive with respect to the control grid and target, shutting off the tube. At the same time, the voltage regulator feedback gate 64a is shut off, since non-zero voltages occur on the cathode which should not be fed to the cathode voltage regulator 78a, which instead maintains the voltage level set by the hold capacitor 134. Blanker 60a provides both horizontal and vertical blanking.

As conventionally known in the art, the tube blanking signal on input 42 also provides the vertical blanking interval for shutting off the pickup tube between fields. The circuitry operates as discussed above relative to the horizontal blanking period.

In accordance with the invention, even in the presence of an excessive highlight of sufficient intensity or duration to trigger the suppression circuit, the pick-up tubes 12a, b, c operate in essentially the same manner as described above during the active scan. However, during the horizontal blanking period and particularly during a selected portion thereof (H pulse), the circuit automatically provides various waveforms in response to the excessive highlights which in turn cause the pick-up tubes to generate a high intensity, defocused, beam which bombards the target to replenish the charge thereon prior to the beam making its next active scan in the forward direction. Thus by way of example only, during the active scan the control grid 16a is at a DC level of approximately −35 volts, the cathode 14a is at zero volts DC, and the auxiliary grid 22a is at a DC level of approximately 320 volts. During the horizontal blanking period, the cathode voltage level is raised to +50 volts DC as described before to turn the tube off. Upon the occurrence of highlights, the control grid, cathode and auxiliary grid levels are variously affected, but only during the horizontal line flyback period corresponding to the horizontal blanking interval so as not to affect the quality of the picture during the active scan wherein the various voltage levels remain the same. The waveforms are shown in FIG. 5.

During the horizontal blanking interval, the tube blanking signal on input 42 performs the same function of blanking the pickup tubes as previously described during the initial time period of the line flyback. However, as previously described, the highlight detector means 28 detects the presence of the highlight by means of the comparators 86a, b, c and the detector 94, which supplies the enable command (FIG. 5E) to the "D" input of the flip-flop 108, which gates the command with the V-drive input (FIG. 5D) to generate a vertically reclocked enable command (FIG. 5F) which occurs during the vertical blanking interval. Thus, regardless of when the highlight is detected during the course of scanning one field, the excessive highlight suppression circuit is not turned on until the succeeding vertical blanking interval. This prevents the signals generated by the highlight suppressing portion of the circuit from affecting the picture quality. Thus the circuit changes modes only during the vertical blanking interval. Thus during this interval and when horizontal blanking occurs (FIGS. 5B, B'), the transistors 102, 104 provide the interrupted blanking signal on line 52a to the cathode blanker 60a (FIG. 4). The re-clocked enable logic signal is supplied to the NAND gate 110, which along with the high provided by the H-pulse input on line 40 (FIGS. 5C, C'), generates a low output state, which pulls down the base of transistor 102. Transistors 102 and 104 are turned off thus providing an interrupted blanking signal which in turn turns off the pull-up transistor which forms the cathode blanker 60a and enables the cathode to be pulled down to an erase level, as further described below.

The output of the NAND gate 110 is introduced to the inverting stage 114 and thence to the emitter-follower transistor 116 which generates the auxiliary grid logic on line 54a, which is in turn supplied to the base of a current driver transistor 138 of the auxiliary grid driver 70a, which also includes a pull-up transistor 140.

The output of the NAND gate 110 is also coupled to the comparator 120 which generates the erase level logic on line 55a at such time as the base of transistor 102 is pulled down by NAND gate 110, which signal is fed to the erase level gate 62a. The erase level gates 62a pull the cathode blanking level down to the erase level which is of the order of from zero to 15 volts positive and is typically 4 volts (FIGS. 5I and 5I').

The pulled-down output of NAND gate 110 is also coupled to the comparators 118 and 122, which are also being used principally as drivers and are triggered at a selected level established by the resistors 142. The comparators 118, 122 generate signals which are used to drive the pull-up transistor 126 and the pull-down FET stage 128 to generate the control grid pulses on line 58a. Since the output of the NAND gate 110 is normally high, the output of the comparator 118 is normally high and the transistors 124 and 126 are normally off. The output of the comparator 122 which acts as an inverting driver is normally low whereby the pull-down FET stage 128 is normally on, corresponding to the low signal on line 58a. At such time as the output of NAND gate 110 goes low, as when the enable command is high and indicative of an existing excessive highlight, the output of comparator 122 goes high which shuts off the FET stage 128. Concurrently, the output of the non-inverting comparator 118 goes low which turns on the transistor 124 and pull-up transistor 126. The latter transistor pulls the voltage level of the control grid signal on line 58a up to the clamping level determined by the clamp 130. The control grid pulse is supplied to the control grid of the pick-up tube via lines 58a and 46a and a coupling capacitor 144 (FIG. 4). It follows that the control grid is raised from the −35 volts DC of the order of 25 volts to a −10 volts DC at such time as the excessive highlight suppression circuit is turned on during the flyback period (FIGS. 5G and 5G').

It is desirable to place a large negative-going pulse on the auxiliary grid of the pick-up tube to cause defocusing of the scan beam so as to provide enhanced erasure of the target. The pull-down transistor 138 and the pull-up transistor 140 of the auxiliary grid driver 70a are normally off whereby a very high impedance leakage resistor 145 holds the auxiliary grid voltage level at +320 volts, the normal auxiliary grid voltage level. To defocus the beam, the auxiliary grid of the pick-up tube is pulled down from the 320 volts to the order of 8½ volts above the cathode erase level of previous mention. To this end, the auxiliary grid logic signal on line 54a is fed to the base of the pull-down transistor 138 which functions as a current source due to the emitter-resistor thereof, and which never saturates due to the auxiliary grid regulator 74a which acts as a clamp. Thus the transistor 138 draws current and pulls the auxiliary grid level down to the desired level of 8½ volts above the cathode erase level (FIGS. 5H and 5H').

The cathode erase level is adjusted via the erase level adjust potentiometer 80a (FIG. 4) which is coupled to the positive input of an operational amplifier 156, which, along with an emitter-follower transistor 158, form the erase level regulator 72a. The emitter of the transistor 158 is coupled to an erase level drive FET 160 which is coupled to the cathode, along with an erase level regulator feedback FET 162 which is also coupled to the positive input of the operational amplifier 146. FETs 160 and 162 define the gates 62a, which when turned on pull the cathode level from its +50 volts during blanking down to the cathode erase level. This action is performed by the erase level logic signal on line 55a at the time that the H-pulse on line 40 is received by the NAND gate 110, provided also that the vertically re-clocked enable command has been introduced during the vertical blanking interval to the NAND gate 110 of FIG. 3, which corresponds in turn to the existence of an excessive highlight. Separate feedback and drive FETs are employed since only so much current will pass through a FET until it comes out of saturation and has a voltage drop across it. The drive FET 160 does the actual pull-down of the cathode voltage level. The operational amplifier 156 varies the base voltage on the emitter-follower transistor 158 to compensate for voltage drops across the drive FET 160. A transistor 164 with two resistors connected to its emitter provides the means to turn on the FETs 160, 162 properly.

The auxiliary grid regulator 74a is formed of an operational amplifier 146 and transistor 148 whose emitter is coupled to the collector of the pull-down transistor 138 by a diode 165. The emitter of 148 is also fed back to the negative input of the operational amplifier 146 via an adjustable feedback resistor network including the auxiliary grid pulse adjust potentiometer 82a. The auxiliary pulse regulator 74a is a somewhat unusual regulator in that it tracks the cathode erase level voltage. Thus the positive input to the operational amplifier 146 is coupled to a sample-and-hold capacitor 150 which maintains the voltage which heretofore has been termed the cathode erase level voltage. As previously mentioned, the feedback from the cathode passes through the erase level regulator feedback gate 162 and charges the capacitor 150 to therein store the erase level voltage. The stored voltage on capacitor 150 controls the auxiliary pulse regulator 74a and is fed directly into the regulator and used to determine the output voltage at the emitter of the transistor 148. The output voltage of the emitter is not the same as the stored voltage in capacitor 150, but is higher. In order to cause an offset, i.e., the 8½ volts by which the auxiliary grid voltage must exceed the cathode erase level, some DC current is fed back through the resistors network which includes the auxiliary grid pulse adjust potentiometer 82a, and additional resistor 152. As commonly know, a constant current through a resistor provides a constant voltage drop across it, thus the voltage at the negative input of the operational amplifier 146 will be the same as the voltage at its positive input, but the voltage of the emitter of the transistor 148 will be higher by the fixed offset, which is insured by the operational amplifier 146. The constant current is sinked by a triple constant current source 154 coupled to the negative input of the operational amplifier 146. The offset of previous mention is the difference between the cathode erase level and the auxiliary grid low state voltage on the emitter of the transistor 148.

As may be seen, changes in the erase level made by adjusting the erase level adjust potentiometer 80a do not require a corresponding adjustment in the auxiliary grid low state voltage since the auxiliary pulse regulator 74a provides the adjustment automatically, i.e., the auxiliary grid low state level will automatically follow the erase level by the fixed offset, which is determined by the triple constant current source 154 and the total resistance of the series combination of fixed resistor 152 and auxiliary grid pulse adjust potentiometer 82a.

The auxiliary grid bias regulator 76a includes the auxiliary grid bias adjust potentiometer 84a coupled to a transistor 166 whose emitter is coupled to the leakage resistor 145 and to the base of the pull-up transistor 140, which is thence coupled to the auxiliary grid logic line 54a.

Thus it may be seen, during the erasure of the target corresponding to the excessive highlight suppression mode of the operation during the horizontal blanking interval, the control grid is raised to a less negative voltage, the cathode is lowered to a cathode erase level of the order of zero to 15 volts positive, and the auxiliary grid is lowered to a level of the order of 8½ volts above the cathode erase level, thereby causing the pickup tubes to generate respective high intensity beams during this period of line flyback within the horizontal blanking interval.

The various electrodes of the pick-up tubes must be returned to the conventional blanking levels prior to unblanking the tube, preparatory to the next active scan so as not to interfere with the picture. Such action is performed when the H-pulse on line 40 supplies a low to one input of the NAND gate 110, whereby the latter generates a high at its output. This switches the various signals generated via the logic/timing pulse waveform circuit 50 of FIG. 3 to their opposite levels, to allow the control grid, cathode and auxiliary grid signals to return to their blanking levels.

The erase level logic signal on line 55a goes low which shuts off the gate means 62a to allow the cathode to return to blanking level. The control grid is returned to its active scan level of approximately $-35$ volts DC when the control grid pulse goes low. Concurrently, the auxiliary grid logic signal on line 54a goes low which turns off the pull-down transistor 138 and provides a quick boost of base current through capacitor 167 to the pull-up transistor 140 which turns on momentarily to pull the auxiliary grid voltage level back up to its normal auxiliary grid high-state of 320 volts, which is then maintained by the leakage resistor 145.

Thereafter, at such time as the tube is un-blanked, the tube blanking signal goes high at the end of the blanking interval. The pull-up transistor of the cathode blanker 60a is turned off by the interrupted blanking signal on line 52a, and the cathode voltage regulator feedback gate 64a turns on again to re-establish the cathode feedback loop. The gate 64a has a low AC impedance on its source, i.e., capacitor 134, causing the gate to quickly pull the cathode to the capacitor voltage of zero volts and thus re-establish the beam at its normal active picture level.

As discussed with reference to turning on the enable command and thus initiating action of the excessive highlight suppression circuit, the circuit is also turned off during the vertical blanking interval as controlled by the V-drive on input 38, which, via the flip-flop 106 causes the NAND gate 110 output to go high thereby returning all the components of the circuit to their active scan states. An exception is that the tube blanking signal on line 42 includes a low-going vertical pulse, which causes the cathode to be pulled up to blanking level of $+50$ volts by blanking transistor 137, and regulator feedback gate 64a to be turned off. The condition is the same during vertical blanking whether in the highlight suppression mode or not. Changing the mode of operation during the vertical blanking interval prevents the fast-rising and falling edges of the various waveforms from interfering with the video. The enable commands generated by the highlight detection means 28 must be of sufficient duration to extend into a vertical blanking interval, otherwise it will not affect the circuit. This action helps prevent minor highlights from turning on the circut unnecessarily.

What we claim:

1. A tube circuit for automatically enabling the excessive highlight suppression mode of operation of a camera pickup tube in response to a video signal level indicative of excessive highlights in the viewed scene, wherein the pickup tube includes an electrode configuration with a control grid, an auxiliary grid, and a cathode, adapted to generate a high intensity beam for bombarding the tube target during the line flyback period, comprising the combination of;

highlight detector means including level detector means formed of threshold means coupled to the tube target for detecting only the excessive video signal corresponding to the excessive highlights, and for automatically generating an enable command only in response to the existence of the excessive highlights;

wherein the level detector means includes means for providing selected output decay time and hysteresis to prevent flickering of the output in the presence of marginal highlights; and control/timing means coupled to the detector means for generating and introducing selected signals to the control grid, the auxiliary grid and the cathode in response to the enable command to enable the excessive highlight suppression mode of operation of the pickup tube during a selected portion of the line flyback period.

2. A tube circuit for automatically enabling the excessive highlight suppression mode of operation of a camera pickup tube in response to a video signal level indicative of excessive highlights in the viewed scene, wherein the pickup tube includes an electrode configuration with a control grid, an auxiliary grid, and a cathode, adapted to generate a high intensity beam for bombarding the tube target during the line flyback period, comprising the combination of:

highlight detector means including level detector means formed of threshold means coupled to the tube target for detecting only the excessive video signal corresponding to the excessive highlights, and for automatically generating an enable command only in response to the existence of the excessive highlights; and control/timing means coupled to the detector means and also to input signals including vertical and horizontal blanking and deflection timing signals, and a beam current control signal for generating and introducing selected signals to the control grid, to the auxiliary grid and to the cathode in response to the enable command and to a subsequent vertical deflection timing signal to enable the excessive highlights suppression mode of operation of the pickup tube during a selected portion of the horizontal blanking interval corresponding to the line flyback period occurring after the vertical deflection timing signal.

3. A tube circuit for automatically enabling the excessive highlight suppression mode of operation of a camera pickup tube in response to a video signal level indicative of excessive highlights in the viewed scene, wherein the pickup tube is provided with an electrode configuration having a control grid, an auxiliary grid, and a cathode which is adapted to generate a high intensity beam for bombarding the tube target during the line flyback period, comprising:

highlight detector means including level detector means in the form of threshold means having its input coupled to the tube target for detecting only the excessive video signal corresponding to the excessive highlights, and for automatically generating at its output an enable command only in response to the existence of the excessive highlights; and control/timing means coupled to the output of the highlight detector means and also to input signals including vertical and horizontal blanking and deflection timing signals, and a beam current control signal for generating and introducing selected signals to the control grid, to the auxiliary grid and to the cathode in response to the enable command to enable the excessive highlights suppression mode of operation of the pickup tube during a selected portion of the line flyback period, said control/timing means including;

logic/timing pulse waveform generating means coupled to the output of the highlight detector means and including, means responsive to the vertical deflection timing signal for re-clocking the enable command to initiate same during the vertical blanking, means for generating an interrupted blanking signal, means for generating control grid pulse signals, means for generating an erase level logic signal, and means for generating an auxiliary grid logic signal, said last four signal generating means being responsive to the re-clocked enable command and to the horizontal and vertical deflection timing signals for initiating the excessive highlight suppression mode of tube operation during the selected portion of the horizontal blanking interval corresponding to the line flyback period.

4. The tube circuit of claim 3 wherein a control grid/cathode control means is operatively coupled to the cathode and includes:

erase level regulator means operatively coupled to the cathode for introducing a selected erase level voltage to the cathode during the excessive highlight suppression portion of the blanking intervals.

5. The tube circuit of claim 3 wherein the control grid/cathode control means includes;

cathode voltage regulator means coupled to the control grid to supply a DC voltage thereto, and including a feedback path from the cathode, said feedback path including switching means for disabling the feedback during the blanking intervals;

wherein DC voltage supplied to the control grid is automatically adjusted by the cathode voltage regulator to correct for any deviation of the cathode voltage from zero volts during the unblanked portion of the horizontal scanning period; and beam current regulator means coupled to the cathode for supplying a selected current level thereto when the tube is un-blanked.

6. The tube circuit of claim 5 wherein the auxiliary grid control means includes auxiliary grid driver means coupled to the auxiliary grid, and auxiliary grid bias means coupled to the driver means for generating a large negative-going voltage pulse thereto in response to the auxiliary grid logic signal.

7. The tube circuit of claim 6 wherein the erase level regulator means further provides a reference voltage to the auxiliary grid control means, wherein the auxiliary grid driver means generates the large negative-going voltage pulse delivered to the auxiliary grid, said erase level regulator means further being coupled to the cathode to apply the selected erase level voltage thereto simultaneously with ocurrence of the large negative-going voltage pulse delivered to the auxiliary grid.

8. The tube circuit of claim 7 wherein;

said means for generating the interrupted blanking signal includes transistor means selectively coupled in response to the re-clocked enable command;

said means for generating the control grid pulses includes pull-up and pull-down transistor means, and clamp means coupled thereto for determining the level of the control grid pulses in response to the re-clocked enable command;

said means for generating an erase level logic signal includes operational amplifier means for generating a selected logic state in response to the re-clocked enable command; and said means for generating an auxiliary grid logic signal includes transistor means for generating a selected logic level in response to the re-clocked enable command.

9. The tube circuit of claim 8 wherein;

said cathode voltage regulator means includes a hold capacitor, and an operational amplifier coupled to the hold capacitor and operatively coupled to the control grid for supplying thereto the regulated DC voltage, wherein said switching means for disabling the feedback path is coupled to the operational amplifier, and wherein the cathode feedback path is coupled to the erase level regulator means.

10. The tube circuit of claim 9 wherein;

the auxiliary grid driver means includes pull-up and pull-down transistors operatively coupled to the auxiliary grid and responsive to the auxiliary grid logic signal;

the auxiliary grid bias means includes a transistor stage adapted to supply the large negative-going voltage pulse to the pull-up and pull-down transistors of the driver means; and wherein the reference voltage introduced to the auxiliary grid control means for the erase level regulator means is generated via an auxiliary pulse regulator means formed of a pulse regulator operational amplifier operatively coupled between a sample-and-hold capacitor and a transistor which is operatively coupled in turn to the pull-down transistor of the auxiliary grid driver means, and a resistor network feedback path coupled from the transistor to the input of the pulse regulator operational amplifier, wherein the reference input of the operational amplifier is coupled to the erase level voltage regulator means, wherein the reference voltage from the auxiliary pulse regulator which is fed to the auxiliary grid control means tracks the selected erase level voltage fed to the cathode.

11. The tube circuit of claim 10 wherein the erase level regulator means includes;

an erase level operational amplifier coupled from an erase level adjust potentiometer and an emitter-follower transistor with the common junction therebetween coupled to the sample-and-hold capacitor, and a switching stage coupled from the emitter-follower transistor to the cathode feedback path and responsive to said erase level logic signal for supplying the selected erase level voltage to the cathode during the excessive highlight suppression mode of operation.

* * * * *